Nov. 13, 1956
L. MESTRE
2,770,516
DEPOSITING MACHINES
Filed May 11, 1953
11 Sheets-Sheet 3
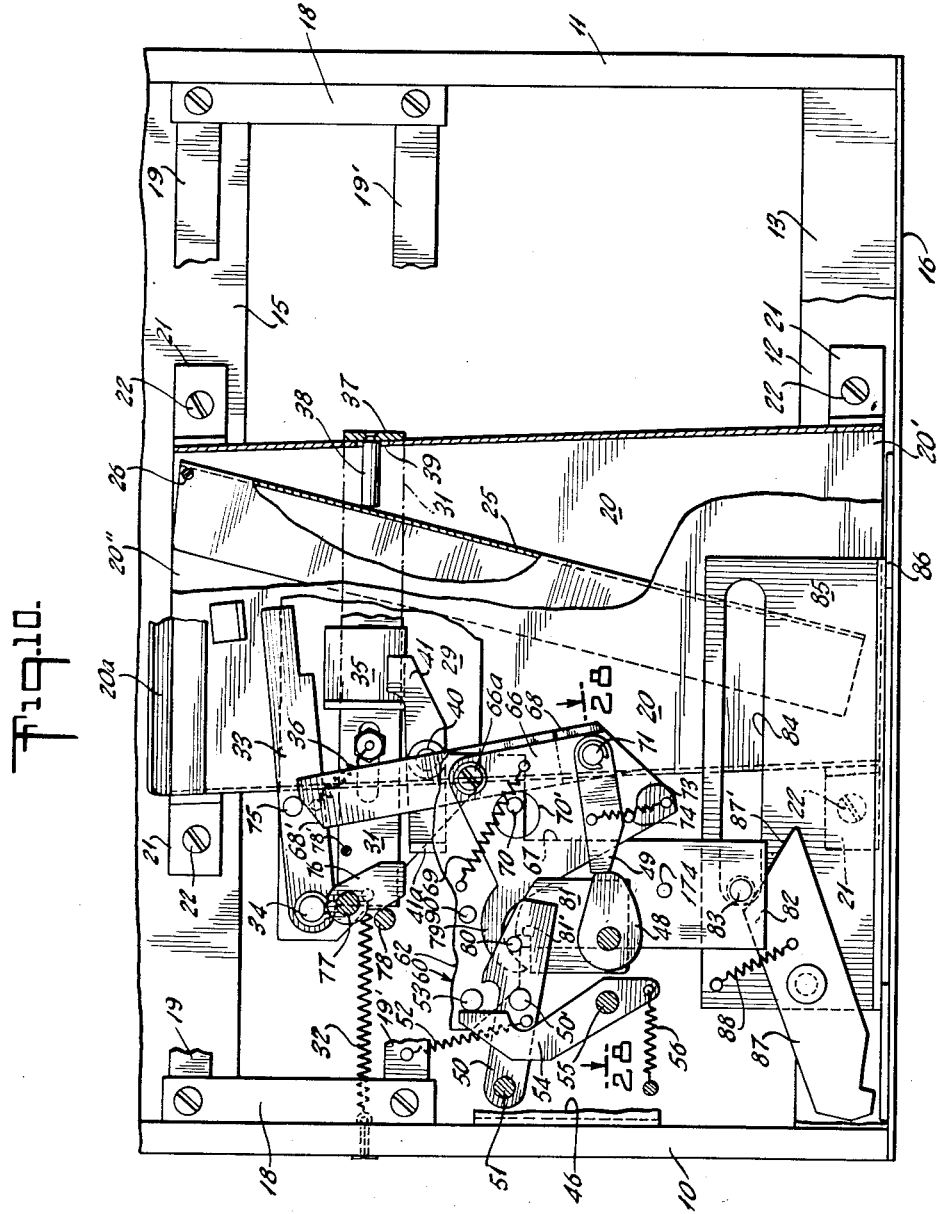
INVENTOR
LUIS MESTRE
BY
John M. Cole
ATTORNEY

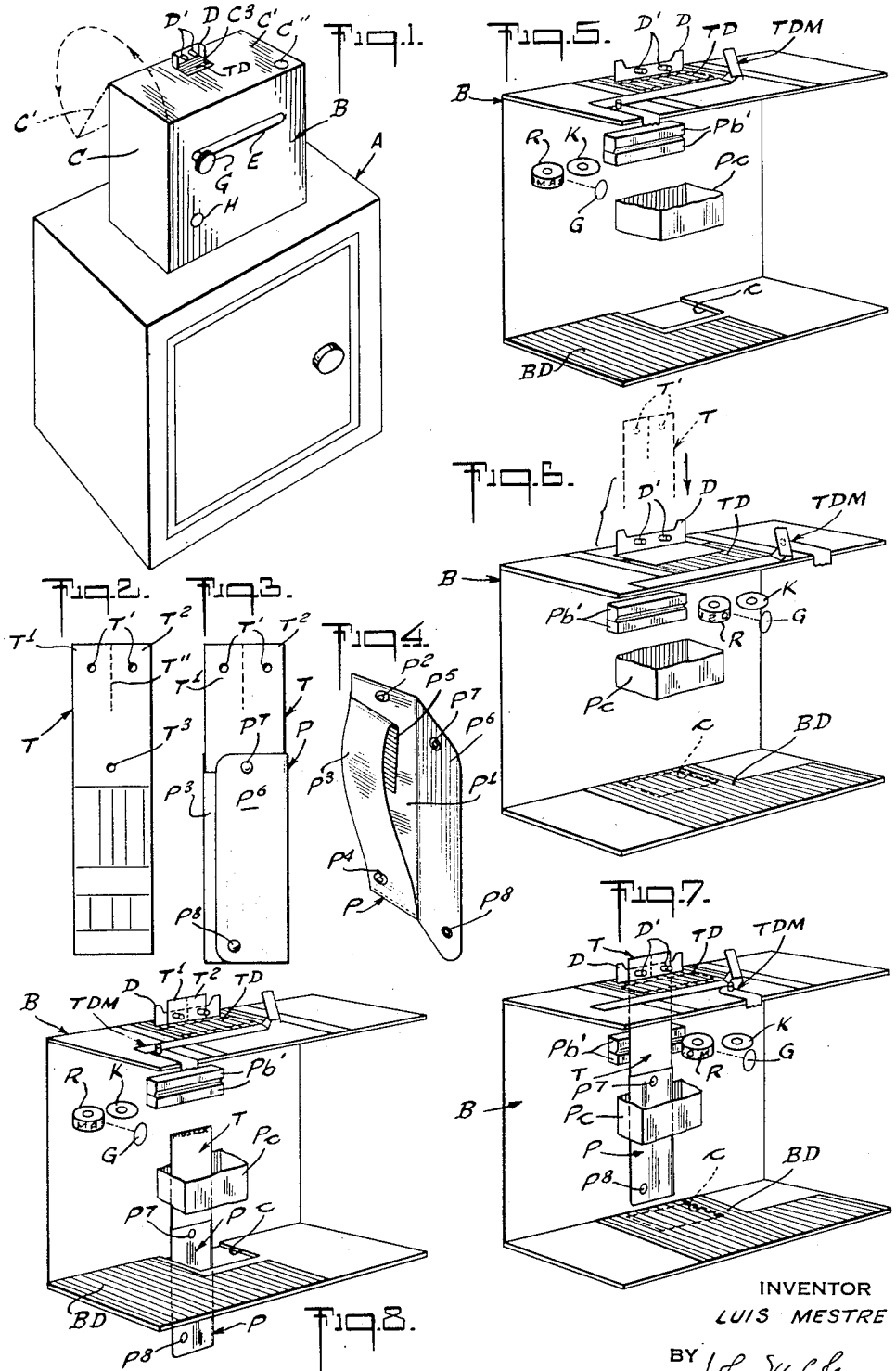

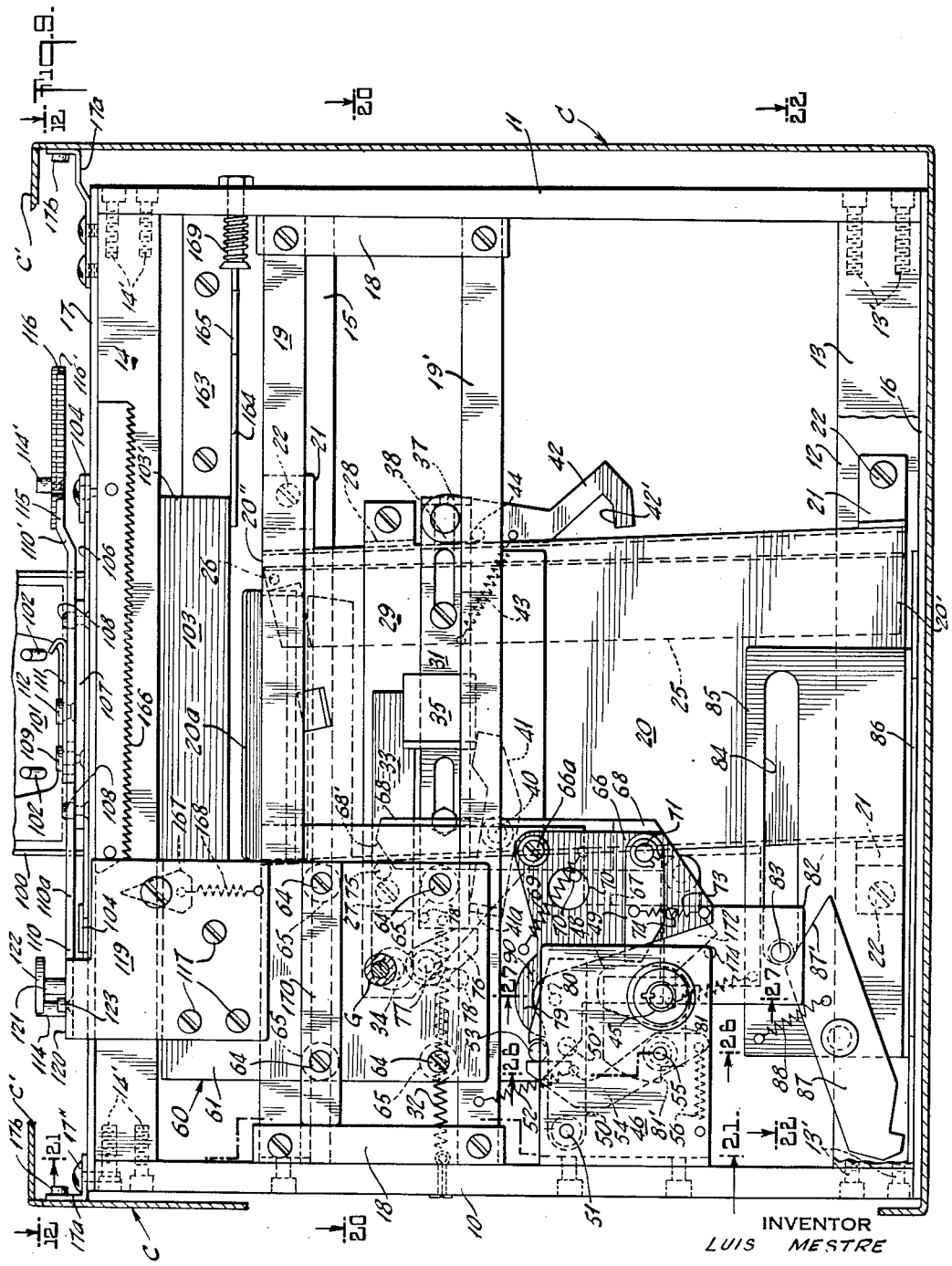

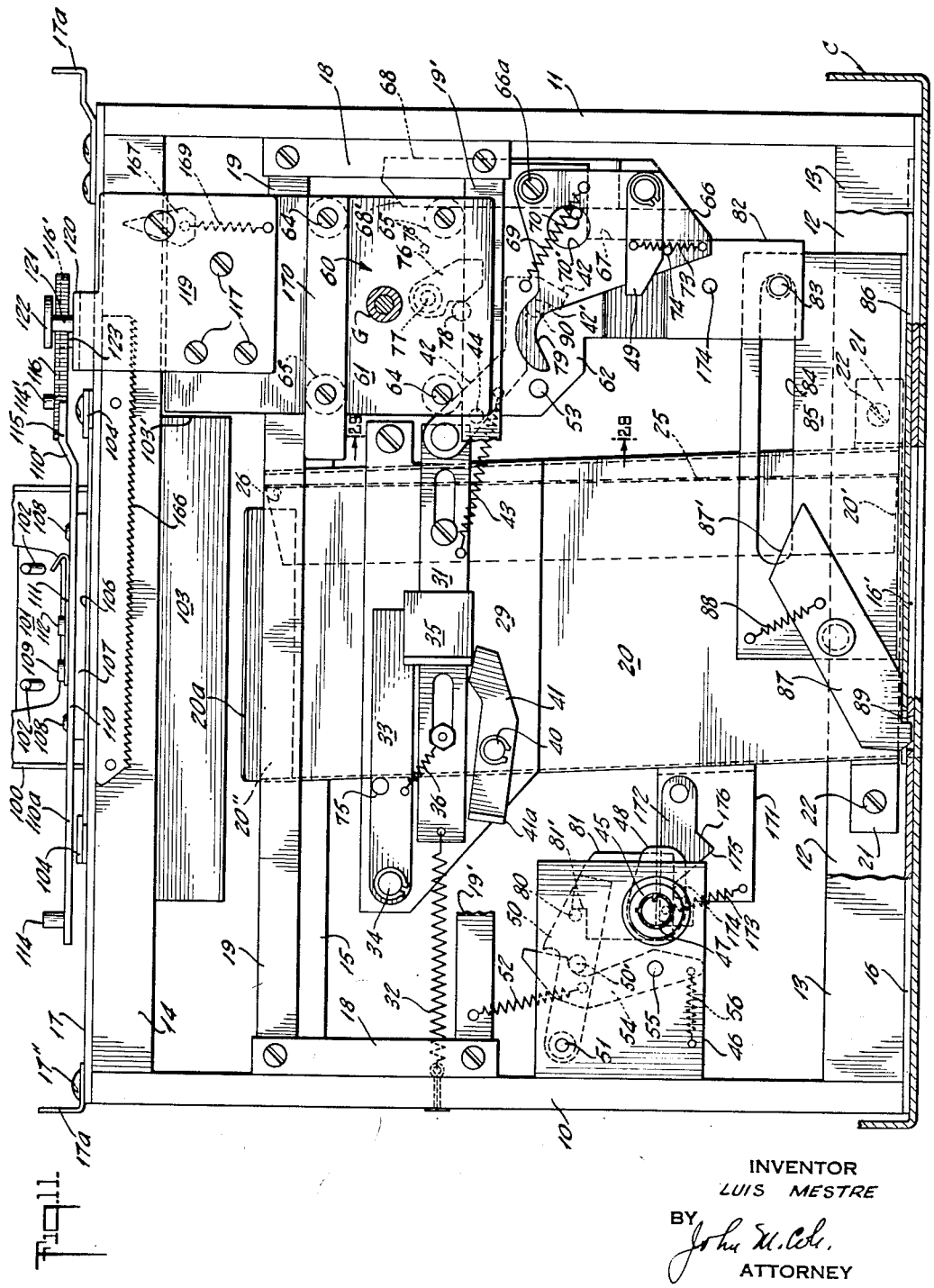

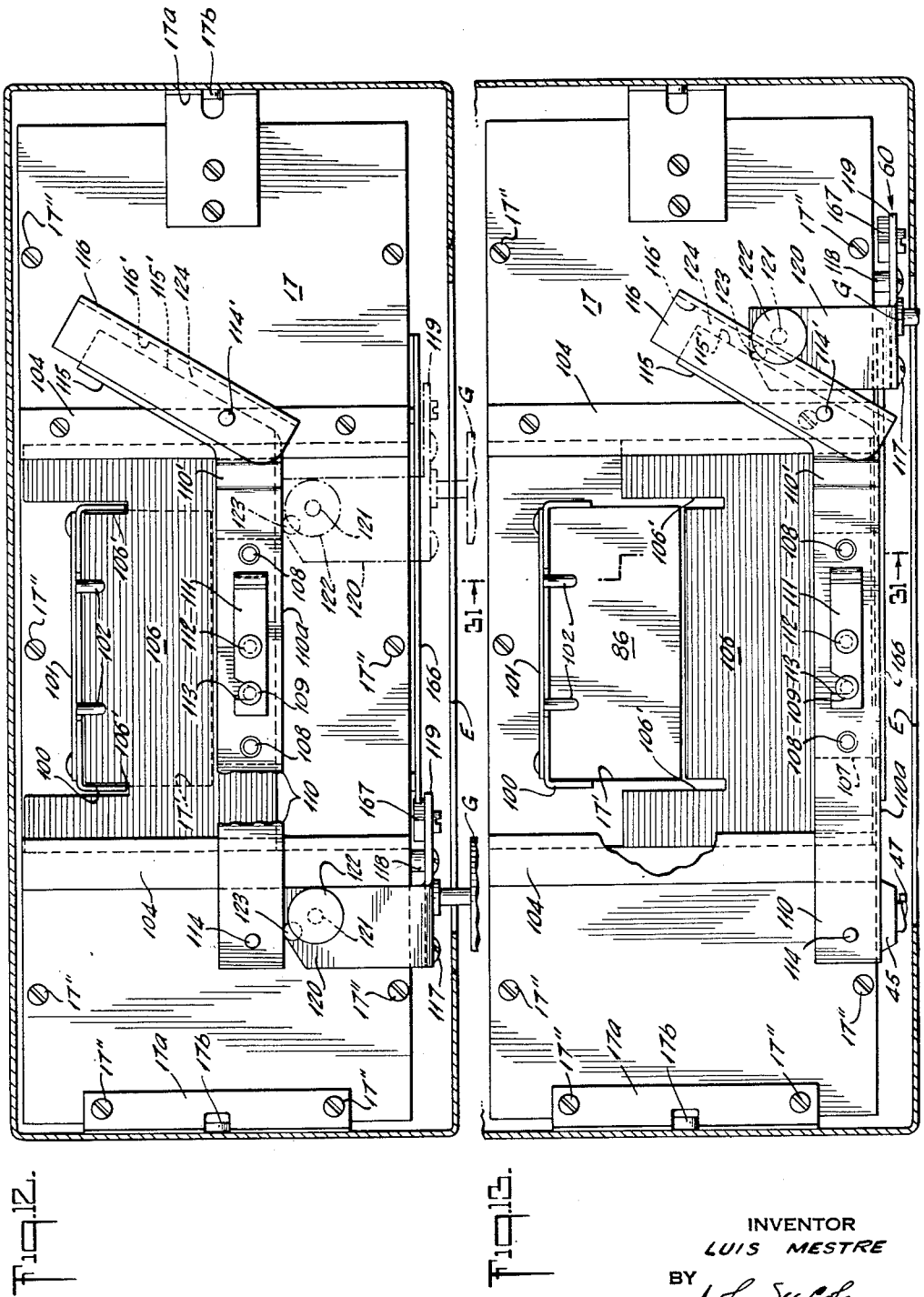

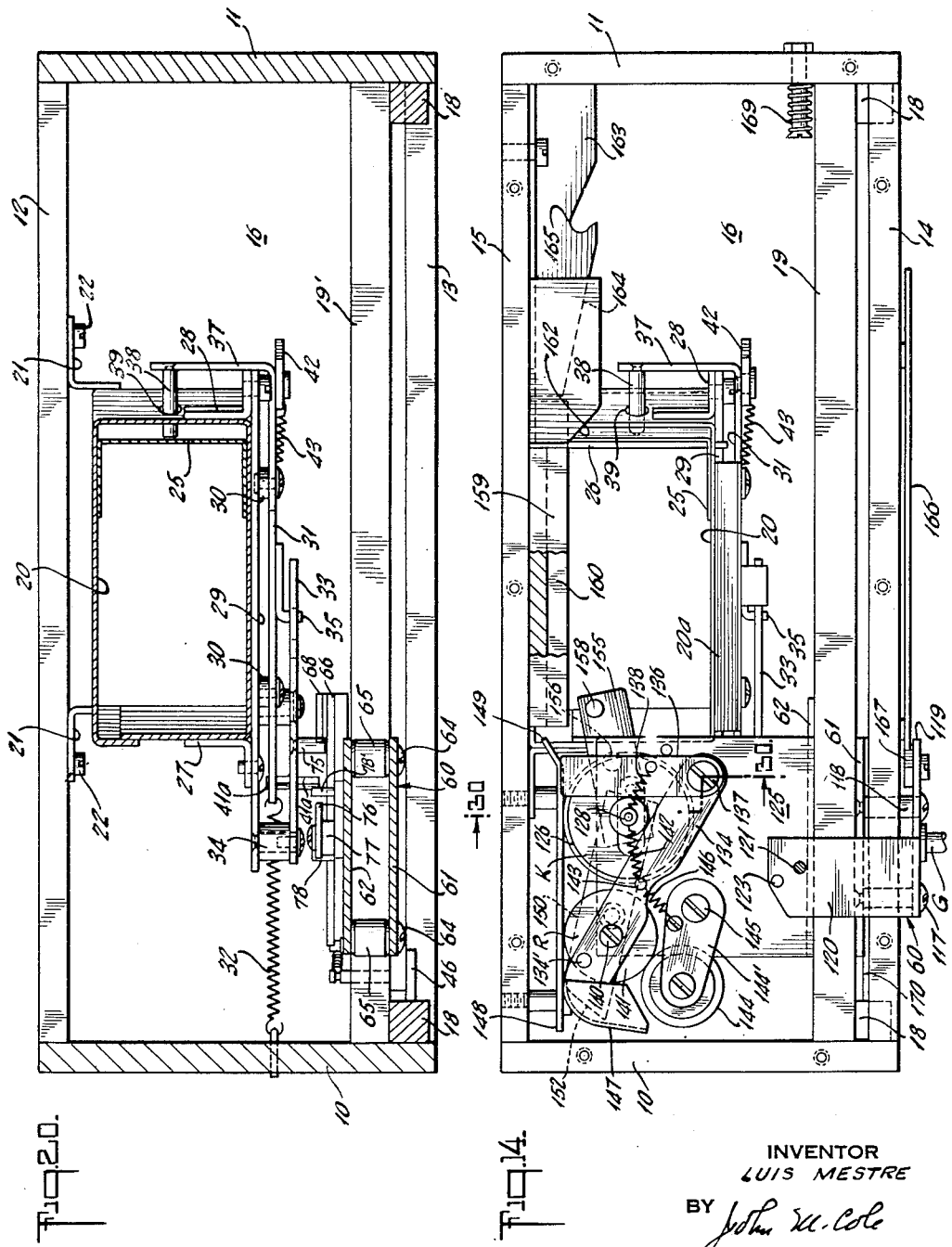

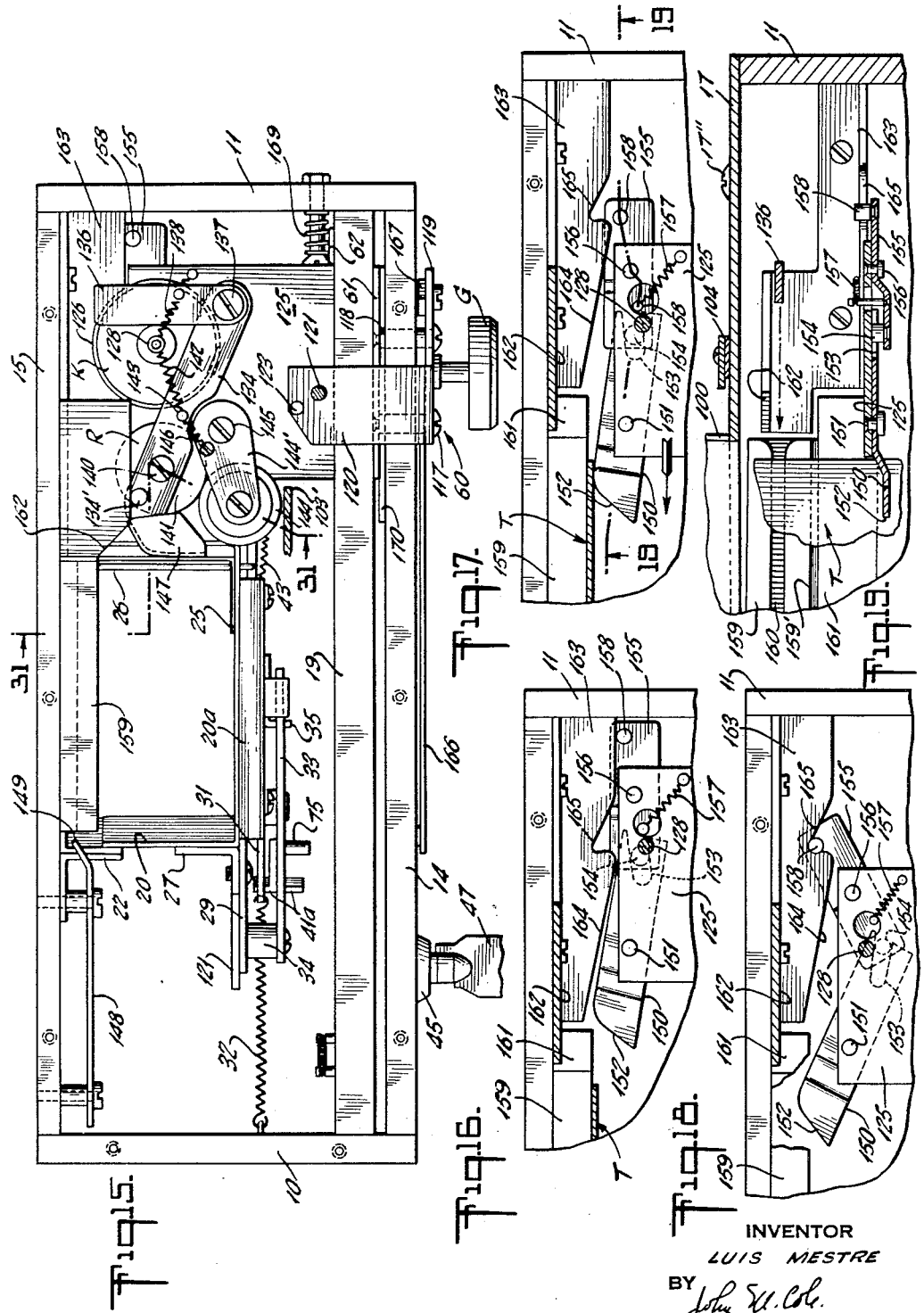

Nov. 13, 1956 L. MESTRE 2,770,516
DEPOSITING MACHINES
Filed May 11, 1953 11 Sheets-Sheet 8

INVENTOR
LUIS MESTRE
ATTORNEY

Nov. 13, 1956
L. MESTRE
2,770,516
DEPOSITING MACHINES
Filed May 11, 1953
11 Sheets-Sheet 9
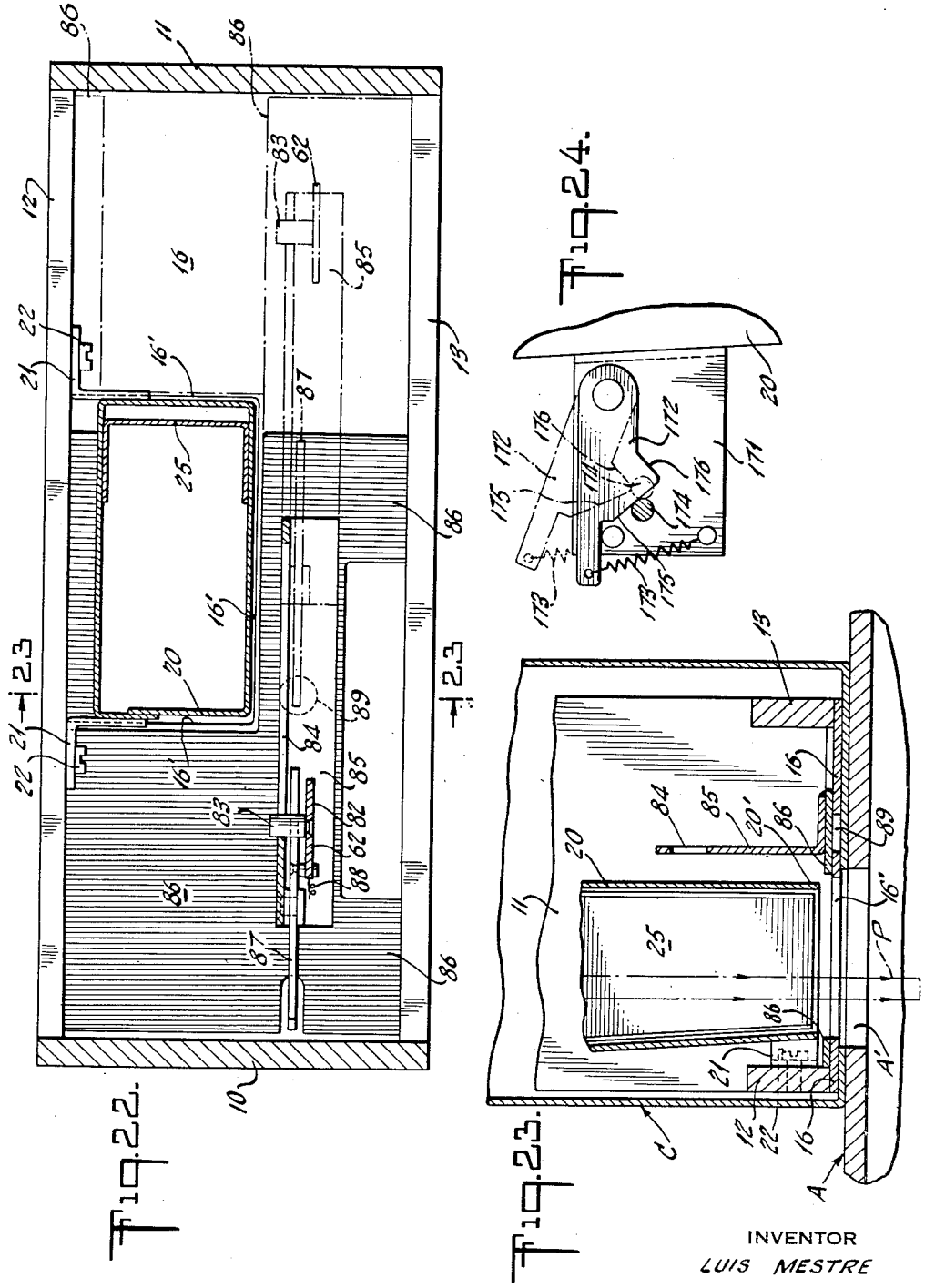
INVENTOR
LUIS MESTRE
BY John M. Cole
ATTORNEY

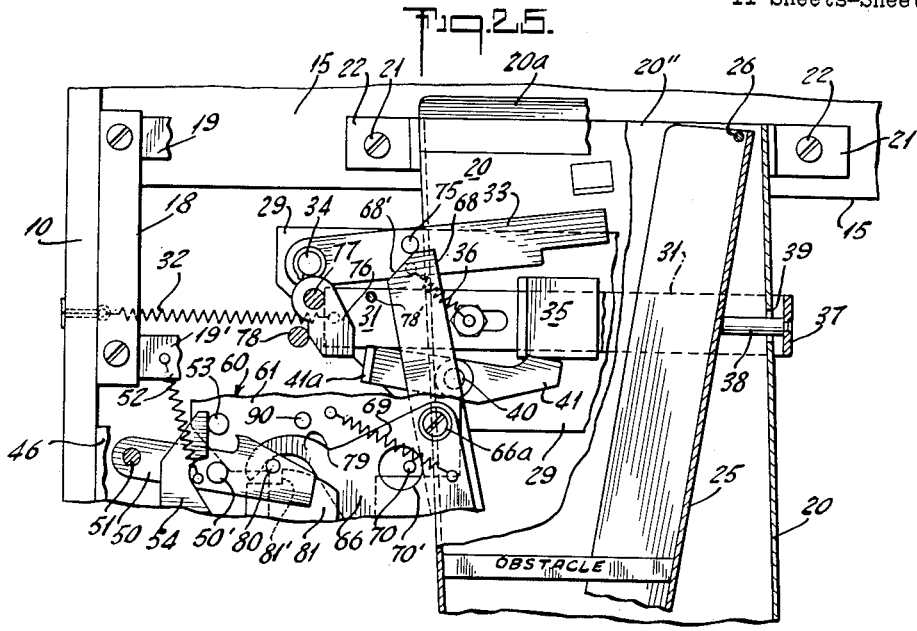

Nov. 13, 1956  L. MESTRE  2,770,516
DEPOSITING MACHINES
Filed May 11, 1953  11 Sheets-Sheet 11
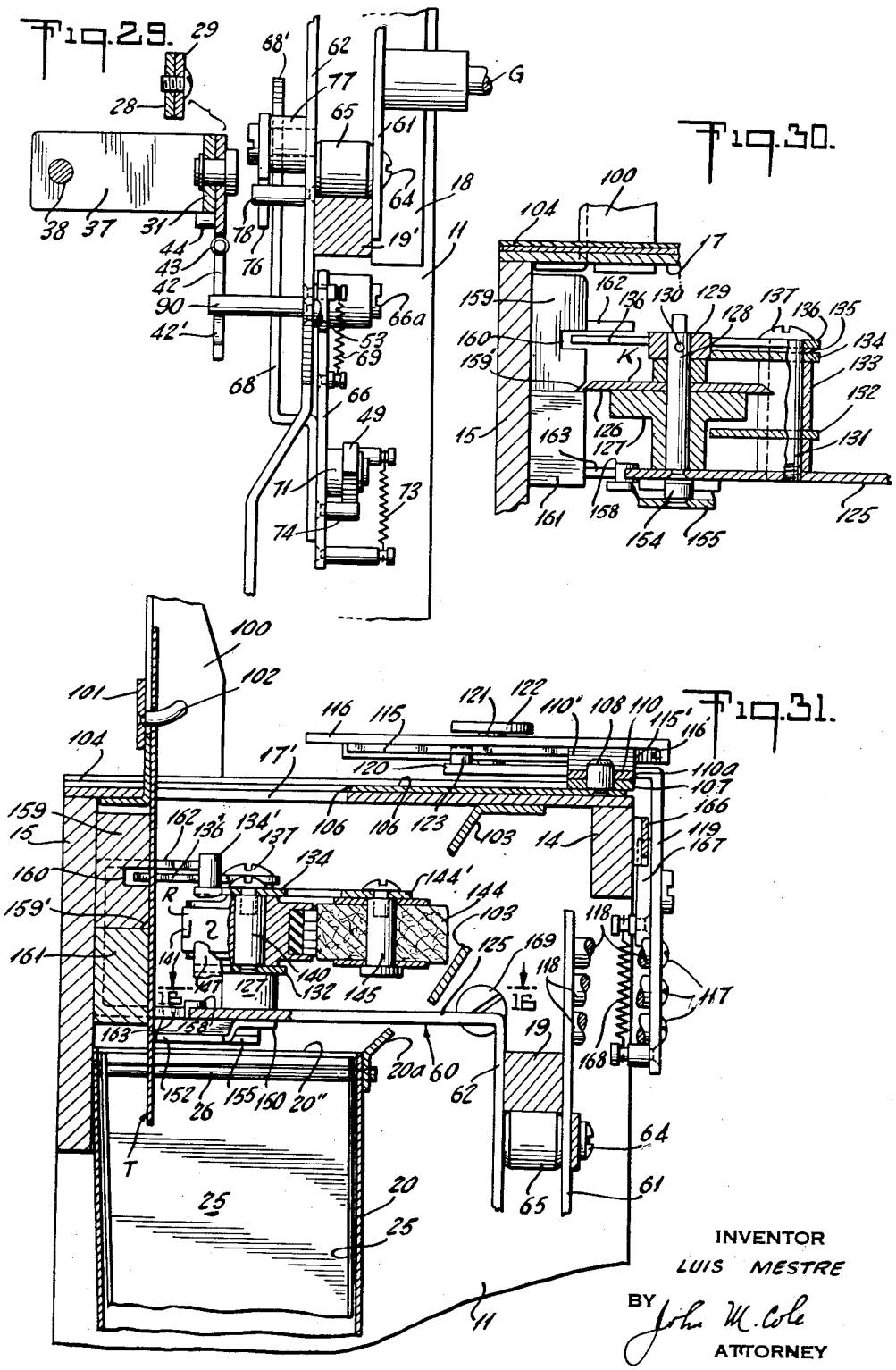
INVENTOR
LUIS MESTRE
BY John M. Cole
ATTORNEY

United States Patent Office

2,770,516
Patented Nov. 13, 1956

2,770,516

DEPOSITING MACHINES

Luis Mestre, New York, N. Y., assignor to The Mosler Safe Co., New York, N. Y., a corporation of New York Application May 11, 1953, Serial No. 354,014

33 Claims. (Cl. 346—22)

The present invention relates to depositing machines.

In mercantile establishments and other types of business where large sums of money are received by sales personnel, collectors and the like, it is essential that adequate provision be made for accurate and expeditious accounting for the funds and for the safe storage of the same. In many establishments it is customary to have authorized persons make periodic collection of funds, and for the clerk to account daily at the controller's office for all the receipts. The time consumed in thus collecting and accounting for the receipts, where numerous employees are involved, may well be very substantial.

The present invention relates to depositing machines associated with high security safes so that a deposit may be made directly by the clerk and its safety is assured. A single machine can handle the deposits of a large sales personnel, for example, 100 persons, without making it necessary for any one of them to go to a cash station or to be off sales duty for any appreciable length of time.

Ordinarily one of the depositing machines will be mounted on top of a safe at the height where one can readily manipulate it. It may, however, be mounted over a chute which leads to a master or main safe. The person making the deposit has no access to the mechanism of the machine, except so much as is made available by a key provided the person for the purpose. The mechanism of the machine is in a locked chamber or housing extraneous of the safe proper so that it can be serviced without having access to the valuables in the safe.

The deposits to be made are prepared by the depositor by aid of a deposit ticket and may include an accumulation of bills, coins, checks, etc. This deposit is preferably in the form of a package adapted to hang down inside the machine from a suitable support with bag for coins. It preferably includes two portions, one to provide one or more receipts removable by the clerk and evidencing the fact that a deposit has been made, and the other the tally sheet with the actual deposit.

Access to the support for the deposit is preferably possible when a normally closed top door is unlocked by one who has a proper key. At this time access to the safe is prevented so that pilfering is imposisble. When the deposit package is placed in the machine, the depositor can then operate the machine through a predetermined cycle (preferably irreversible) during which the receipt portion of the ticket and deposit portions (both of which must be present) are each marked, as by printing or embossing to show that a deposit was made corresponding with the receipt, and vice versa, then the lower portion of the deposit package is severed from the other so that the receipt portion may be removed while the deposit portion has gone beyond the control of the clerk and cannot be recovered from the safe in an unauthorized manner. During this cycle, the severed package is first intercepted so that it does not fall into the safe, and gravity discharge into the safe is thereafter effected, whereupon all the parts are restored to the first position and the key can be removed so that another deposit may be made.

The use of a suitable number of these depositing machines and safes, properly distributed about the store will cut down lost time of sales people, and avoid needless travel, release cashiers for more productive work and afford extraordinarily complete protection against theft and fire losses. Instead of having a daily queuing up of clerks to turn in the day's receipts which consumes many of employees' time hours, the machines to be shown and described herein are capable of handling well trained personnel at the rate of about thirty per minute. Deposits may, of course, be made at any time that the accumulation is such as to make it desirable.

The present invention contemplates a depositing machine having a normally-closed top opening adapted after the machine is unlocked to be manually opened so that the deposit ticket with deposit may be lowered into a chute, a then closed bottom door preventing access to the safe, and mechanism by which the top door may be closed, suitable printing and severing operations carried out to provide the receipt stubs and then the bottom door opened so that the deposit is dropped from the chute into the safe; also the provision of such a machine with a sensing mechanism responsive to the retention of a deposit or presence of a foreign article in the chute to thereby render the machine inoperative to reopen the top door.

A further object of the present invention is to provide a depositing machine in which the manual back and forth movement of an operating handle carries out all the various steps incident to the acceptance of a deposit, the printing and issuing of a receipt and the relocking of the mechanism.

A still further object of the present invention is to provide a depositing machine with means which prevents an operator during the upper door opening stroke of the machine from passing the printing mechanism over unprinted receipt stubs so as to obtain a false receipt.

A still further object of the invention is to so arrange all of the carriage-carried parts that none of them is accessible for tampering while the upper door is open.

Other and further objects of the present invention will appear as the description proceeds.

The machine shown herein is an improvement in machines for the same general purposes as those shown in application Ser. No. 276,571, filed by Arthur R. Mosler on March 14, 1952, now Patent No. 2,699,372, issued January 11, 1955.

The accompanying drawings show, for purposes of illustrating the present invention, one embodiment in which the invention may take form, it being understood that the drawings are illustrative of the invention rather than limiting the same.

In the drawings:

Figure 1 is a perspective view of a safe with the depositing machine mounted on top, the operating handle in home position;

Figure 2 is an elevational view of a paper deposit ticket;

Figure 3 is an elevational view of a deposit ticket and pouch for containing deposits;

Figure 4 is a perspective view of a pouch opened up;

Figure 5 is a diagrammatic perspective view with top and bottom doors of the depositing machine in the home positions and the cutting and printing devices in the home position, but displaced vertically;

Figure 21:
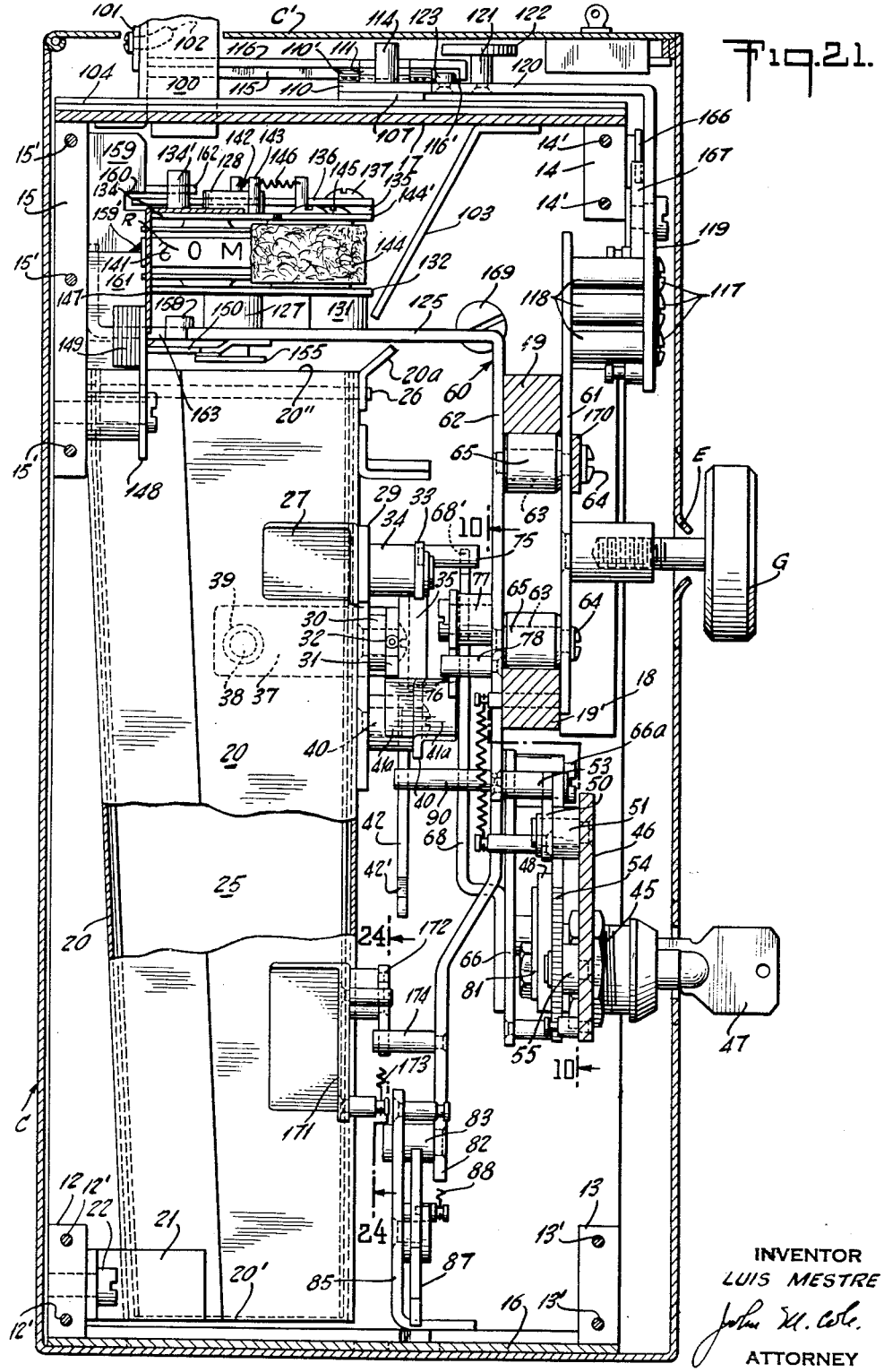

Figures 6, 7 and 8 are views similar to Figure 5, Figure 6 showing the parts in the far, or extreme right-hand position in which the lower door is closed, the upper door opened so that a deposit package may be inserted, Figure 7 showing the parts with the package inserted and the carriage return initiated sufficiently to close the upper door, and Figure 8 showing the parts in the position after printing and severance of the deposit ticket and at the completion of the return movement of the carriage;

Figure 9 is a front elevational view showing the depositing machine with parts in the home position as in Figure 5, portions of the housing being indicated in the section, the package feeler being in normal position and the operator's key not being in the lock;

Figure 10 is a sectional view taken on the line 10—10 of Figure 21, illustrating the position to which many of the parts shown in Figure 9 move after insertion and turning of the key, the carriage and carriage operated parts being freed for manual movement;

Figure 11 is a front elevational view of the machine showing the parts in the extreme right-hand position, and corresponding with Figure 6;

Figure 12 is a section on line 12—12 of Figure 9, below the covering lid and showing the top cover plate of the machine, the top door being closed and the carriage carried parts in the home position;

Figure 13 is a view similar to Figure 12 but showing the parts in the extreme right-hand position (top door open), as in Figure 11;

Figure 14 is a top plan view of the machine with the top cover plate removed showing the carriage and cutting and printing mechanism in the home position as in Figures 9 and 12;

Figure 15 is a view similar to Figure 14, but showing the parts in the extreme right-hand position as in Figures 11 and 13, parts being broken away;

Figure 16 is a fragmentary sectional view on the line 16—16 of Figure 31, showing the carriage in the extreme right position and a package in position to be engaged by the return lock-feeler finger;

Figure 17 is a view similar to Figure 16, showing the package feeler finger engaging a package to permit return of the carriage;

Figure 18 is a view similar to Figure 17 showing the position of the package feeler finger in the absence of a package and the locking of the carriage against return;

Figure 19 is a vertical sectional view taken on the line 19—19 of Figure 17;

Figure 20 is a section taken on the line 20—20 of Figure 9 to show the package feeler finger and associated mechanism;

Figure 21 is a vertical sectional view taken on the line 21—21 of Figure 9;

Figure 22 is a horizontal sectional view on the line 22—22 of Figure 9, showing the bottom door open in full lines and closed in dot and dash lines;

Figure 23 is a transverse sectional view on the line 23—23 of Figure 22, showing the machine mounted on top of the safe and the passageways open for the passage of the package into the safe;

Figure 24 is a fragmentary sectional view on the line 24—24 of Figure 20, showing the dog for holding the carriage in home position;

Figure 25 is a view similar to Figure 10, showing how an obstacle remaining in the chute has blocked release of the carriage upon manipulation of the key;

Figure 26 is a fragmentary section on the line 26—26 of Figure 9, showing a latching lever;

Figure 27 is a sectional view on the line 27—27 of Figure 9, showing the locking cam up and a fragment of the carriage;

Figure 28 is a sectional view on the line 28—28 of Figure 10 showing the locking cam in engagement with the carriage lock release dog;

Figure 29 is a fragmentary sectional view on the line 29—29 of Figure 11;

Figure 30 is a fragmentary sectional view on the line 30—30 of Figure 14, illustrating the rotary knife and the false reset stripper; and Figure 31 is a vertical sectional view on the lines 31—31 of Figures 13 and 15.

*The diagrammatic showing of Figures 1 to 8*

Figure 1 indicates at A a safe having the usual door and safe-door locking mechanism. The safe has an entrance opening (see Figure 23) for the deposits. Mounted on top of the safe A is the depositing machine B, to be discussed hereinafter in detail.

The operating mechanism of the depositing machine is in a metal box or housing C with a hole $c$ in the bottom aligned with the hole in the safe. The housing is secured to the safe and the depositing machine is removably secured in the housing. The housing has a hinged cover C' provided with a key operable master lock C'' and having a hole $C^3$ through which protrudes a ticket guide and ticket holder D having ticket engaging means in the form of studs D'D'. The front of the housing has a horizontal slot E through which extends a carriage operating handle G. The front also has an opening H to accommodate an unlocking device such as a clerk's key.

The preferred form of ticket or deposit form is illustrated at T in Figure 2. The ticket is made of medium weight paper stock of suitable width and length (for example 3⅛" x 10¾"). At the upper end, it has two holes T', T' spaced the same as the studs D', D' and perforaton T'' between these holes so that two receipts $T^1$ and $T^2$ may be had after the deposit is completed. It has a hole indicated at $T^3$. It is provided with blanks for the clerk making the deposit to fill in and sign, and carries three printed numbers for identification of the deposit, the clerk's receipt $T^1$ and the cash control box receipt $T^2$. The numbers on the deposit end of the ticket are spaced below the numbers on the receipt stubs.

A suitable form of deposit holding pouch P is shown in Figures 3 and 4. It is made from a sheet of pliable plastic and has a central back portion $P^1$ carrying a snap fastener stud $P^2$, a left portion $P^3$ carrying a snap fastener stud $P^4$ and provided with an infolded flap $P^5$, and a front portion $P^6$ having snap fastener buttons $P^7$ and $P^8$.

When the clerk is to make a deposit, all details necessary for accounting control and itemization of receipts, such as bills, coins, checks, etc. are entered on the front and the ticket is signed. The money and ticket are placed in the pouch, the stud $P^2$ passed through the hole $T^3$ of the ticket and the pouch secured closed by the snap fasteners. The package may be held by the clerk in one hand while manipulating the machine.

When the deposit machine is not in use, the carriage operating handle, or knob, G is at the left as in Figures 1 and 5 and the carriage is locked against movement. At this time the carriage-carried printing or embossing roller R and rotary cutter K are at the left, the top door TD is closed and the bottom door BD open, all as shown in Figure 5. When the key, not shown, is inserted and turned, the carriage is released by mechanism to be described so that it can be shifted to the right as in Figure 6. This operation has brought the handle G, roller R and cutter K to the right, has closed the bottom door BD, and top door mechanism indicated at TDM has opened the top door TD.

The deposit package is then lowered through the open hole $C^3$ in the top of the housing and hung on the pins D', D'. It extends down past pressure blocks Pb', Pb' and into a package chute Pc as indicated in Figure 7. As the bottom door BD is now closed, the package cannot fall into the safe, nor can anything be fished up out of the safe. When the deposit package is thus hung on the pins, it is possible to return the carriage to the left or home position. During the initial leftward movement, the top door operating mechanism TDM closes the top door (Figure 7); then the printing roller R and cutter K cross the ticket and print and sever it. Part of the printing is above and part below the severing line. The carriage return also effects an opening of the bottom door BD so that the severed portion of the package drops away from the ticket stubs $T^1$ and $T^2$ and enters the safe. This is illustrated in Figure 8.

At the end of the leftward stroke, the carriage is locked against movement by mechanism to be described and the key can be turned backward and removed.

The machine frame and package chute

In the machine shown in detail in Figures 9–31, all operating parts are carried on a frame adapted to be lowered into the housing C through the top when the cover C' is open. The housing and machine are bolted to the safe.

The frame has a left end plate 10, a right end plate 11 and distance pieces or bars 12, 13 at the bottom, 14 at the upper front and 15 at the upper rear, secured to the end plates by screws 12', 13', 14' and 15' (Figure 21). At the bottom is secured a plate 16 having a discharge opening 16' (Figures 11 and 23) over the safe inlet hole A'. Across the top is a removable top plate 17 having a package receiving opening 17' secured in place by screws 17''. The top plate is provided with laterally extending brackets 17a, 17a, notched as indicated and engageable with pins 17b, 17b in the housing walls to align the machine in the housing.

Along the front edges of the end frame plates are two carriage rail supports 18, 18 and these carry upper carriage rail 19 and lower carriage rail 19', here shown as square bars.

The package chute Pc (Figures 5–8) is shown in Figures 9–31 as a tube 20 of rectangular cross-section. It is secured to the upper rear bar 15 and the lower rear bar 12 by brackets 21 and screws 22. Its lower end 20' is immediately above the discharge opening 16' in the bottom plate and its upper end 20'' is spaced below the opening 17' in the top plate 17 and provided at the front with a package deflector 20a. The chute is preferably slightly out of the vertical as indicated more clearly in Figure 10.

Key unlocking

In order that the machine may be conditioned for normal operation, when the clerk initials the depositing operation by inserting the key, it is essential that the chute be empty; i. e., no foreign deposit or remains of a previous deposit should be present therein. This condition is assumed in the drawings (except for Fig. 25.).

Inside and at the right of the chute 20 is a package feeler 25, pivoted on a pin 26 and normally hanging free. The chute carries two brackets 27 and 28 which detachably support a package feeler lock plate 29 and parts carried thereby. Spacers 30 (Fig. 20) slidably support a slotted strap 31 biased to the left by spring 32. It is held in this position by a feeler latch 33 pivoted at 34 and held down against a bracket 35 on strap 31 by spring 36. The other or right-hand end of strap 31 is bent rearwardly, as indicated at 37 and carries a pin 38 which passes through a hole 39 in the chute 20 and terminates a short distance from the package feeler.

The plate 29 is provided with a pivot post 40 below the sliding strap 31 on which is mounted a carriage release lever 41 loaded at the left 41a and held up against the bottom of the bracket 35 (Fig. 9). Pivoted to the right-hand end of strap 31 is a feeler reset hook 42 biased clockwise by spring 43 to bring the rearwardly extending post 44 which it carries against the under side of the strap 31. These parts (31, 32, 33, 35, 36, 37, 38, 41, 42) are in the position shown in Figures 9, 14, 15, 20 and 21 to sense the absence of a package when the chute is empty, the carriage in the home position and the clerk's key operated lock locked, and thus are preset for release when that lock is unlocked.

The key operated lock shown at 45 (H, Fig. 1) is carried on a bracket 46 attached to the lower portion of the left end plate 10. This lock is of a conventional type adapted to be operated by a key 47 (or a knob not shown) and the barrel of the lock has, rearwardly of the bracket, a cam 48 adapted to cooperate with a release dog 49 to be later referred to. The bracket 46 carries a carriage locking hook 50 pivoted at 51 and biased upwardly by a spring 52 against a carriage carried pin 53. The bracket 46 also carries a carriage lock holding hook 54, pivoted at 55 and normally held against the left side of the pin 53 by a spring 56, as shown in Figure 9.

The carriage rails 19, 19' support the carriage generally designated by the reference character 60. The carriage has a front plate 61, which extends upwardly and carries mechanism to be described in a later portion of the specification, and a rear plate 62 which carries mechanism cooperative with the key lock mechanism and the package feeler mechanism described above. The plates 61 and 62 are secured together by distance pieces 63 and screws 64 and these distance pieces carry rollers 65 which bear on the carriage rails 19, 19'.

The rear carriage plate 62 carries near the right edge and below the lower rail 19' a pivot post 66a on which is pivoted a carriage lock release dog 66. The carriage plate 62 is cut away as indicated at 67 and a feeler latch release 68 welded to the lock release dog so that these two parts move as a unit about the post 66a. They are biased clockwise by a spring 69 against post 70 carried by plate 62 and entering hole 70' in dog 66. They are normally in the position shown in Figure 9.

The carriage lock release dog 66 pivotally supports at 71 the release dog 49 (above referred to). This dog is biased downwardly by a spring 73 against a pin 74 and is located to be in the path of the lock cam 48 when that cam is shifted from the home position Figure 9 to the unlocked position of Figures 10, 11 and 28.

When the release dog 49 is engaged by the key lock operated cam 48, it is pushed to the right and swings the carriage lock release dog 66 counterclockwise from the position of Figure 9 to the position of Figure 10. This swings the upper end of the feeler latch release 68 to the left and brings its beveled edge 68', Figure 10, against a pin 75 extending forwardly from latch 33, thereby lifting this latch from engagement with bracket 35 and releasing the slotted strap 31 so that spring 32 may shift it to the left. The chute 20 being empty, the strap 31 shifts all the way as indicated in Figure 10 and the lower edge of bracket 35 passes beyond the high portion of release lever 41 and, owing to counterweight 41a at its left end, the right end of this lever rises as indicated in this Figure 10. This brings the lowered left end below the path of a carriage locking dog or pawl 76 pivotally carried at 77 by the carriage plate 62, and normally resting against a stop pin 78 (see Figure 10), and confined below stop pin 78'.

The movement of the key cam 48 also causes the carriage release dog 66 to move farther than necessary to release the lever 41 and a hook-like extension 79 on the upper left part of dog 66 engages a pin 80 carried by locking hook 50 to shift this hook down far enough to bring it below the center of pin 53 against which it is rearwardly biased so that the pin may cam the lever down. When the key is turned all the way, the members 48 and 49 form a toggle and the mechanism remains in the home position, but the carriage is released for movement. The clerk can then release the key and take hold of the carriage shifting handle G and make a quick movement to the right.

Package feeler resetting by carriage movement to the right

During the carriage movement to the right, various operations are executed in sequence. Those below the carriage rail will now be described.

The movement of pin 53 carried by the rear carriage plate brings it against the under side of the point of locking hook 50 and cams this hook down. At the same time it releases hook 54 for movement by spring 56 to bring it to a position to pass over the pin 50' on locking hook 50 so as to secure this pin against upward movement by the spring 52, see Figure 11. When 50' is in this position, pin 80 on hook 50 is behind a notch 81' of a plate 81 carried by the shaft of the key released lock, so that return movement and release of the key is now impossible.

The initial movement of the carriage has also separated release dog 49 from the lock cam 48 so that it no longer holds the carriage lock release dog 66 in the position of Figure 9, and it thereupon is brought back by spring 69 to its original position relative to the carriage where it remains during the remainder of the right-hand movement of the carriage.

The extreme lower end 82 of the rear carriage plate 62 is provided with a pin 83 which travels in a slot 84 in a bracket 85 fixed to the bottom door 86 of the machine. In the home position of the carriage, the pin 83 is at the left end of the slot and the bottom door 86 is at the left so that the chute is open at the bottom. When the carriage is approximately half-way across, the pin 83 reaches the right-hand end of the slot 84 and further movement of the carriage will carry the bottom door along with it, shifting it to the position of Figure 11. When in this position, a latch 87 pivoted on bracket 85 and biased counter-clockwise by spring 88 enters a hole 89 in the bottom plate of the machine and prevents improper opening of the lower door.

During the movement of the carriage to the right, a pin 90 extending rearwardly from the rear carriage plate 62 is brought against the feeler reset hook 42 and swings it counter-clockwise, tensions springs 43 and rides along the under-side of the hook until it enters the notch 42' in this hook. It then pulls on the hook and pulls the slotted strap 31 and parts carried thereby to the right. By the time the carriage has reached the extreme position of Figure 11, the strap 31 has been pulled far enough to the right so that latch 33 drops behind the bracket 35, and frees the package feeler 25 in the chute 20. It also lifts the weighted end of release lever 41.

*Top door*

As shown more clearly in Figures 9, 11, 12, 13 and 31, the top cover plate carries a top package guide 100, package hanger 101, with pins 102, a downwardly and rearwardly extending package deflector 103 (Figure 21) and top door guides 104, 104 disposed on opposite sides of the top door opening 17'. This opening is above the chute 20. The guides 104, 104 receive a top door 106 (TD) in the form of a flat plate. It is cut back as indicated at 106' to accommodate the sides of the package guide.

The top door 106 is normally closed as indicated in Figures 12 and 21. At the front it carries a spacer plate 107 provided with two pins 108 and a headed stud 109. These pins receive a bar 110 extending to the left and right and carrying a latch 111 pivoted at 112. This latch has a notch 113 adapted to enter under stud 109 to secure the bar in place at the top door. It can be detached only when the carriage is in the home position. The ends of the bar 110 carry upwardly projecting pins 114, 114' which (see Figures 9 and 21) reach almost to the hinged cover c of the housing C. These prevent removal of the bar should the latch 111 be manipulated by a tool inserted in the opening in the cover C' while this cover is closed. The right-hand end of the bar 110 is offset as indicated at 110' and extends obliquely rearwardly as indicated at 115, where it carries a downwardly flanged door opening cam plate 116.

*Top door opening mechanism*

The front plate 61 on the carriage supports by means of screws 117 and spacers 118 a plate 119 which extends in front of and above the top front frame bar 14 and has a portion 120 which extends rearwardly above the cover plate 17 at a height to clear the top door guides 104. The portion 120 of the plate 119 carries a post 121 with a large head 122, also a small pin 123. The pin 123 engages, when the carriage is in the home position (Figure 12), the front edge 110a of bar 110, and moves along this edge to hold the top door closed during the major portion of the movement of the carriage. When it moves beyond this edge, it passes under the flanged cam member and enters groove 124 between the flange 116' and the edge 115' of extension 115.

Further movement of the carriage to the right causes the pin 123 to traverse this groove and forces the door 106 to move forwardly to the position shown in Figures 13 and 31, thereby conditioning the machine for the reception of a package.

The bottom door is nearly closed, as above described, before the top door starts to open and is locked closed by the time the top door is fully open. No access may be then had through the open top door and chute to the main safe, nor can a package be accidentally dropped into the safe, neither can the clerk remove the key.

*Printing and cutting mechanism and ticket feeler*

The printing and cutting mechanisms generally referred to in Figures 5–8 by the letters K and R are supported by the carriage and when in the home position are disposed as shown in Figures 5, 14, 21 and 30. The rear carriage plate 62 has an upper rearwardly extending flange or platform 125 at a level slightly above the top of the chute 20. This flange carries the cutter K, printing roller R (Figures 5–8) and package feeler mechanism. The cutter K (Figure 30) includes a rotary cutter knife 126 secured on a hub 127, rotatably carried on a stud 128, riveted to the flange 125. The cutter is removably held in place by a stud collar 129 and lock screw 130.

The flange or bracket 125 also carries a printing roller arm supporting stud 131 (Figures 14, 30 and 31). This stud receives a lower printing roller arm 132, a bushing 133, an upper printing roller arm 134, a bearing and spacer collar 135 and false receipt stripper 136, held down by a screw 137, biased by spring 138 against the collar 129 on the cutter carrying stud.

The printing roller arms 132 and 134 span the cutter knife 126 and support on a stud 140 a rotatable printing roller 141. This roller is freely revolvable so that on its engagement with the ticket, it is in random positions and printing varies from ticket to ticket. The arms are biased rearwardly by a spring 142 connected between stud 143 and cutter carrying stud 128. An inking roller 144 is carried between arms 144' mounted on post 145 and biased against the inking roller by spring 146. The upper roller arm 134 carries a stud 134' cooperating with a lifting cam to be described.

When the carriage is at the left, the printing roller is urged rearwardly by the spring 142 and a shoe 147 carried by the arms 132 and 134 bears against a fixed plate 148 (Figure 21) obliquely flanged as indicated at 149 (Figure 14).

The carriage supported flange 125 (as shown in Figures 14–19) also supports a ticket feeler lever 150 pivoted at 151 and having a beveled nose 152 which, when in the left position, bears on the plate 148. The right-hand end of the feeler lever 150 is slotted at 153 and receives a pin 154 carried on the left end of a carriage locking lever 155 pivoted to the flange 125 at 156, biased counter-clockwise by a spring 157 and carrying an upwardly extending stud 158.

The upper rear tie bar 15 carries below the top door opening an upper cutter pressure block 159 with a slot 160 at the level of the false receipt stripper 136 and cut back at 159' to accommodate the cutter knife 126, and a lower cutter pressure block 161 having a sharp upper edge in a position to cooperate with the cutter 126. The bar 15 also carries a printing roller lifting cam 162 at the level of the stud 134' on the printing roller arm and a cutting carriage lock plate 163 at the level of the stud 158 on locking lever 155 and having a sloping surface 164 and a notch 165.

The upper front distance piece 14 carries a rack 166 and the front angle plate 119 carries a pawl 167 biased to end position by a spring 168.

When the carriage is shifted from the home position to the extreme right position, the upper mechanisms are carried through a series of movements. After a short movement of the carriage, sufficient to cause the pin 79 to engage the plate 81 and lock the key against removal as above described, the rack pawl 167 engages the rack 166 and immediate return movement of the carriage is prevented. The cutter 126 and false receipt stripper 136 enter the spaces provided by the pressure blocks 159, 161, the nose 152 of feeler lever 150 moves along the oblique surface 149 of plate 148 and then the feeler lever 150, being at a lower level than the lower pressure block 161, passes under it allowing the spring 157 to jackknife the parts 150, 155. The printing roller 141 rolls across the pressure blocks. (But for the action of the false receipt stripper to be described, it would print a ticket stub and issue false receipt stubs.) The pin 158 on lever 155 engages the cam surface 164 on plate 163 and brings about a shift in the position of the levers 150, 155 and when the pin 158 is opposite the notch 165 in plate 163, the pin drops onto this notch (Figure 18). Further movement causes the pin 158 to pass to the right of the notch and bring the feeler lever 150 and locking lever to the position shown in Figures 15 and 16. Just before the carriage reaches the end of its movement to the right, pin 134' on the upper printing roller arm engages cam 162 and lifts the printing roller to the position shown in Figures 15 and 31. The right portion 103' of deflector 103 restrains the inking roller 144 against bouncing away from the printing roller. The pawl 167 has now passed beyond the rack 166. A bumper 169 absorbs the shock at the end of the right-hand movement.

*Acceptance of deposit*

In the extreme right-hand position, the machine is ready, as shown for the deposit package. The clerk, having previously prepared the deposit package by filling out the card and placing the deposit in the pouch, now lowers the pouch into the open chute and hangs it on the posts 102, thereby conditioning the machine for return movement of the carriage. The package should be hung carefully from both posts, so that the ticket is in the rear position.

Assuming that the package is present, as indicated in Figures 7, 16, 17, 19 and 31, the operations which take place on return movement of the carriage will now be described.

During the initial left-hand movement, the pin 123 of flange 119 has traversed the top door closing groove 124 and closed the top door. As soon as the left end of package feeler finger 150 reaches the package, it rides up onto the package and, as indicated in Figures 17 and 18, this prevents the spring 157 from urging the pin 158 into notch 165 of locking plate 163. At about the same time, pawl 167 engages the rack 166 and cam 162 allows the printing roller to move toward the ticket T so that it can roll over the ticket as left-hand movement of the carriage is continued. By the time the printing roller is about half-way across the ticket, the cutter reaches it and commences cutting along a line such that part of the printing is above and part below the line of severance. As movement continues, the false receipt stripper engages the ticket and swings back to ride up onto the ticket, the pin 123 rides along in front of the top door keeping the door closed, the printing roller passes beyond the ticket over the end of lower pressure block and onto the plate 148, the false receipt stripper 136 drops off the ticket stubs, the severing operation is completed and the package is released, and the package feeler 150 rides up onto the plate 148. The leftward movement is arrested by a stop 170 carried by the upper carriage plate 61.

The lower carriage carried mechanism is also accomplishing a series of operations. The pin 90 passes away from the feeler rest hook 42 and allows the spring 32 to bring the bracket 35 against the lowered pawl 33. The lower door operating pin 83 approaches the left end of slot 84, engages the upper beveled end 87' of latch 87, swings this latch to lift the lower end out of notch 89 in the bottom plate and then engages the end of slot 84 so as to shift the lower door to the left and open the chute so that the deposit drops into the safe.

Just before completion of the leftward movement, the pin 53 on carriage plate 62 engages the upper end of hook 54 and swings it back to release locking hook 50 so that it moves up and frees the lock barrel for return movement by the key and release of the key. During the final portion of the return stroke of the carriage the release dog 49 climbs up onto the key cam 48.

The lower left part of the chute is provided with a bracket 171 (see Figures 11, 21 and 24) on which is pivoted a holding dog 172 urged down by a spring 173 and in the path of a pin 174 extending rearwardly from the rear carriage plate 62. This dog has sloping surfaces 175 and 176 which permit the pin to pass by. The tensioning of the spring 173 and camming action of surface 176 on this pin not only insure the completion of the leftward stroke but retain the carriage in position when the key is turned in the lock, to shift the release dog 49 and stress spring 73. This avoids an initial movement of the carriage in response to turning the key.

If for any reason the package, or some foreign article remain in the chute 20 at the end of the normal operating cycle, the package feeler will sense this condition, and should one about to make a new deposit operate the key lock, the parts will move only to the position shown in Figure 25. The feeler latch release 68 has lifted the latch 33 from the bracket 35 and the spring has pulled the bar 31 part way to the left, but not far enough to allow the right-hand end feeler release lever 41 to rise as high as in Figure 10. This keeps the left or weighted end 41a up so that it is in the path of the arresting pawl 76 on the carriage plate 62. The carriage cannot be moved to the right. The clerk can, however, remove the key. This mechanism prevents one from holding the deposit in the chute by a string and re-operating the carriage to retrieve the purported deposit.

Should one try to return the carriage without making a deposit, or to operate the machine to get receipt stubs without using a suitable length ticket to extend below package feeder 150, there would be no ticket in the path of the nose 152 of the package feeler and locking lever 155 would assume the position shown in Figure 18. This would stop the carriage return movement before anything was done on the stubs, and the cleark could not regain possession of the key. The machine would not be disabled for the carriage could be moved to the right to reopen the door, and a proper deposit made.

Should one try to get a false receipt on the right-hand stroke of the machine by inserting only the stub portions of a ticket before shifting the carriage to the right, the false receipt stripper 136, which at that time is in the position shown in Figure 15 will engage the left edge of the stub and strip the stub off the pins 102.

When the outer casing C is closed, there is no access except through the top opening and then only when the top door is opened by the carriage. The mechanism is outside the chute and not accessible. Then the lower door is closed so that no access may be had to the safe. For limited servicing, sufficient access is available when the top lid C' of the casing C is opened, one can thus remove the door closing cam bar 110 and associated parts, so that the carriage may be shifted while the top of the chute is open. It is also possible to remove the screws 17" and take off the top plate 17. This gives access to the cutting and printing mechanism. The entire machine may be lifted out of this housing C, if desired.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. Deposit apparatus for use with a deposit package having two portions, the upper one being adapted to become a receipt and the other, when separated from the receipt portion, to be accepted as a deposit, said apparatus including a safe having an opening in the top thereof; a lockable housing secured to the top of the safe above said opening and having a deposit receiving opening in the top thereof above the top opening in the safe; and a depositing machine in said housing, said machine having a vertically disposed, upwardly opening, stationary package receiver accessible through the housing opening and having means to support a deposit package in pendent position; a stationary chute below the package receiver and open at the top and bottom, a normally closed upper door above the chute and adjacent the package receiver, a normally open lower door below the chute, severing mechanism below the upper door, and manually operable mechanical means movable from a normal or home position through a cycle and back to the home position thereof, including means for maintaining the upper door closed and the lower door opened, means for thereafter closing the lower door and holding it closed while it opens the upper door so that a package may be placed in the deposit support while access to the safe is denied, and means for then closing the upper door and opening the lower door, and means controlled by the manual means for actuating the severing means to sever the deposit portion from the receipt portion while the lower door is open so that the deposit portion drops into the safe under the influence of gravity.

2. The apparatus claimed in claim 1, having feeler mechanism for sensing the presence of an object in the chute when the movable mechanism is in the home position and feeler mechanism operated means which interrupts movement of the manually operable mechanism from the home position.

3. The apparatus claimed in claim 1, having means which locks the manually operated means against completion of the cycle unless a package hangs from the package receiver after the upper door is closed.

4. The apparatus claimed in claim 1, having a key operated lock which when unlocked releases the manually operated mechanism for movement.

5. The apparatus claimed in claim 4, having a feeler mechanism for sensing the presence of an object in the chute when the manually operable means is in the home position, and feeler mechanism operated means which interrupts movement of the manually operable means from the home position when unlocked.

6. A depositing machine for use with a deposit package having two portions, the upper one adapted to become a receipt, the other when separated from the receipt portion, to be accepted as a deposit, said machine having a fixed frame, a frame-carried top plate having a door opening and a top plate carried, normally closed, door shiftable to open position, a frame-carried bottom plate having a door opening, a normally open bottom door carried by the bottom plate and shiftable to closed position, a fixedly carried package receiver having means engaging the receipt portion to support the deposit package in pendent position below the top door opening, a shear plate carried by the frame below the package receiver, a chute extending upwardly from the lower door opening adjacent the shear plate to receive the pendent package, when the upper door is open, horizontal, frame-carried carriage guides in front of the chute, a manually operable carriage reciprocably carried by the guides, the carriage having a normal or home position when at one end of the guides and a far position when at the other end of the guides, means carried by the carriage and the upper door for opening the upper door for receipt of the package when the carriage approaches the far position and closing it when the carriage moves from the far position, means carried by the carriage and the lower door for opening the lower door only when the upper door is closed and closing it when the upper door is open, the carriage having a rearwardly extending bracket above the level of the top of the chute, a bracket-carried rotary cutter cooperable with the shear plate and mounted for rotation about a relatively fixed axis whereby a package may be severed as the cutter passes by the shear plate, a bracket-carried swingable printing roller in advance of the cutter and bearing against the package and shear plate on the return stroke for printing on the deposit package before severance, a frame-carried cam to lift the printing roller away from the shear plate when the carriage is in the far position, and cooperable devices carried by the frame and carriage bracket for locking the carriage against return to the home position in the absence of pendent package.

7. A depositing machine such as claimed in claim 6, wherein the top plate has top door guides in which the top door moves forwardly to open and rearwardly to close, the carriage has a member which reciprocates above the top plate, and the top door has a bearing surface parallel with the guides and an oblique slot traversed by the carriage-carried member to hold the top door closed and to open and close said door.

8. A depositing machine such as claimed in claim 7, having a top door-carried detachable bar which provides the bearing surface and the slot whereby, when the bar is removed, the top door may be kept open for servicing.

9. A depositing machine such as claimed in claim 6, wherein the carriage has a lost motion pin and slot connection with the bottom door, the bottom door is guided for movement parallel with the carriage, and having a carriage-operated latch which holds the bottom door in closed position until the carirage has moved back to take up the lost motion and shifts the said latch.

10. A depositing machine such as claimed in claim 6, having a carriage bracket supported stripping finger, spring biased against a stop and above the level of the cutter, the finger being yieldable when brought against a package while the carriage is moving toward the home position and being rigid and immovable should it engage a purported deposit when moving away from the home position.

11. A depositing machine such as claimed in claim 6, having a frame-supported rack and a carriage-carried pawl which require that carriage movement once started from the home position be continued to a position where opening of the top door is initiated, whereupon the pawl passes beyond the rack and the front door can be opened and closed as desired.

12. A depositing machine such as claimed in claim 6, having a frame-carried movable pin and a carriage-carried locking dog engageable with the pin when the carriage is in the home position to prevent actuation of the carriage until the pin is shifted to release the locking dog.

13. A depositing machine for use with a deposit package having two portions, the upper one adapted to become a receipt, the other when separated from the receipt portion, to be accepted as a deposit, said machine having an enclosing casing provided with a top entrance opening and a bottom discharge opening, and mechanism in the casing including a top door for opening and closing the top opening, a bottom door for opening and closing the discharge opening, a stationary, substantially vertical chute between the doors, a fixed package receiver and package hanger adapted when the top door is open to engage the receipt portion and support the deposit package pendent in the chute, a manually operable lock shiftable between locked and unlocked position, a reciprocable carriage lockable in home position by the manual lock and when unlocked manually shiftable to a far position and back to locked position, carriage operated means which prevents shifting the manual lock to unlocked position except when the carriage is in the home position, full stroke mechanism which requires that the carriage after being moved a finite distance from its home or from its far position must complete the stroke without reverse movement, carriage operated lower door control means which require substantially complete closing of the lower door before the carriage when moving from the home position passes beyond the full stroke mechanism, carriage operated upper door control means for effecting opening and closing of the upper door only when the carirage is beyond the full stroke mechanism in the far position, cooperative printing and cutting devices carried by the carriage and effective in the return stroke after the package is in place and the upper door is closed and the full stroke mechanism is reengaged to first print in both portions of the deposit and thereafter sever the deposit from the receipt portion, the lower door opening means opening the lower door during said return movement to normally allow the deposit to drop free.

14. A depositing machine such as claimed in claim 13 having a carriage-carried false receipt stripper engageable, after the full stroke mechanism has become engaged in the movement of the carriage from the unlocked position, with a purported receipt portion on the package hanger to strip the same off the package hanger, whereby printing a false receipt on said stroke is prevented, and and return of the manual lock to the unlocked position is also prevented until after a complete cycle of operations has been carried out.

15. A depositing machine such as claimed in claim 13, having means for sensing the presence of an undischarged package in the chute and for thereupon preventing release of the carriage for movement when the manual lock is shifted to unlocked position.

16. A depositing machine such as claimed in claim 15, having carriage-operated means to latch the sensing means in a releasable position during carriage movement and manual lock operable means to unlatch the sensing means coincident with release of the carriage.

17. A depositing machine for use with a deposit package having two portions, the upper one adapted to become a receipt, the other, when separated from the receipt portion, to be accepted as a deposit, said machine having a vertically disposed, upwardly opening, stationary package receiver having means engaging the receipt portion to support the deposit package in a pendent position in the receiver, a vertical chute in which the deposit may hang pendent, a horizontally reciprocable carriage movable between a home position and a far position, an upper door above the chute and movable between closed position which denies access to the chute and an open position in which a deposit may be suspended from the package receiver, a lower door below the chute and movable between open and closed positions, carriage operated means which closes the lower door when the upper door is open so as to prevent simultaneous access through both doors or the accidental dropping of a package through the chute, package severing means including a stationary shear plate behind the package and below the supporting means therefor and a rotary, carriage-carried, cutter mounted on a relatively fixed axis and shiftable past the shear plate when the upper door is reclosed to thereby separate the two portions so that the lower one drops past the opened lower door while the receipt portion is retained, carriage-carried package marking means including a printing roller movable transversely of the package in advance of the severing means and at a height to print the package both above and below the line of severance and provide indicia on both the receipt portion and the deposit portion, and spring means biasing the printing roller toward the package and shear plate in both directions of the movement of the carriage.

18. A depositing machine such as claimed in claim 17, having a carriage-carried false receipt stripper means which is inactive in the cutting and printing stroke and effective on the initial stroke to strip a purported receipt off the package support.

19. In a depositing machine, a fixed frame carrying a substantially vertical chute, a manually operable, horizontally reciprocatory carriage movable from a home position at one side of the chute to a far position at the other side of the chute and carrying out a cycle of operations, a latching device which normally locks the carriage against movement from the home position, a rockable lock shaft having a cam, an oscillatory member carried by the carriage and spring biased to a predetermined position thereon, cam operated means to shift the oscillatory member to engage the latching device and release the carriage, a chute-carried slider spring-biased to a home position and normally shifted to a far position during a preceding shift of the carriage to the far position, a latch for holding the chute-carried slider in its far position, a latch carried by the oscillatory member and acting to release the latter mentioned latch when shifted by the lock shaft cam so that the chute-carried slider may shift to the home position, a chute-carried feeler movable by the slider in the absence of an obstruction in the chute and which restricts movement of the slider when an obstruction is in the chute, a chute supported follower which takes one position when the feeler engages the obstruction and another in the absence of the obstruction, and a carriage-carried locking pawl into whose path the follower is held by the feeler when engaging such obstruction.

20. A depositing machine for use with a deposit package having two portions, the upper one adapted to become a receipt, the other when separated from the receipt portion, to be accepted as a deposit, said machine having a substantially vertical chute, a deposit hanger above the chute having means to engage a receipt porsion and to support the deposit package pendent in the chute, a shear plate between the support and chute, horizontally reciprocable carriage having a home position and a far position, a platform carried by the carriage and shiftable during the initial stroke from the home side of the chute across the top of the chute to the far side and back again on the return stroke, and being clear of the chute when in either extreme position, a platform-carried cutter rotatably mounted on the platform in a position to cooperate with the shear plate and sever the package, a printing roller arm pivotally-carried by the platform, spring biased toward the shear plate and carrying a printing roller at an elevation to print both above and below the line of severance and disposed in a position to lead the cutter on the return stroke, a stationary cam engageable with the printing roller arm to shift the printing roller away from the plane of the shear plate as the printing roller moves beyond the shear plate toward the far side, and to lower it onto the package on the return stroke, and a platform-carried finger above the level of the cutter spring biased against a stop to be in the path of the pendent package and yieldable on the return stroke but fixed during the initial stroke so as to engage a false receipt portion and dislodge it.

21. A depositing machine for use with a deposit package having two portions, the upper one adapted to become a receipt, the other when separated from the receipt portion, to be accepted as a deposit, said machine having a fixed frame, a fixedly-carried package receiver having means engaging the receipt portion to support the deposit package in a pendent position, a shear plate below the package receiver, a chute into which the pendent package extends, a manually reciprocable carriage movable between a home position to one-side of the chute and a far position on the other side of the chute, a package feeler in the chute, a chute-carried member spring biased against the feeler and movable to biased position by the carriage when moving to the far position, a latch for said chute-carried member, an upper door above the chute, carriage-carried means holding the upper door closed except when the carriage is near the far position, so that a package may then be inserted, a carriage-carried cutter cooperable with the shear plate for shearing the deposit portion from the receipt portion so that the deposit portion normally falls from the chute and the package feeler in the chute normally offers no resistance to the feeler latched member when later released, a carriage-locking device engaged by the carriage in the home position to retain it in such position, a carriage release dog, manually operable unlocking mechanism actuating the carriage-release dog to disengage the locking device and release the carriage, and to release the chute-carried latch, and means operable at response to the failure of the chute-carried member to return to arrest movement of the carriage.

22. A depositing machine having a fixed frame work, a substantially vertical chute, a top door opening above the chute, a bottom door opening below the chute, a top door, a bottom door, a horizontally reciprocable carriage manually operated between a home position and a far position, a manually operated lock which normally holds the carriage in the home position and when unlocked releases it, carriage-operated top door shifting means which opens and closes the top door only when the carriage is in the far position, carriage-operated bottom door shifting means which opens and closes the bottom door only when the top door is closed, a package support above the top door and on which a package extending into the chute may be hung pendent when the top door is open, a stationary shear plate above the chute and past which the package extends, a carriage supported cutter cooperable with the shear plate to sever the package and release it for falling through the bottom door opening, a chute supported slider biased to the home position, a slider reset device engageable by the carriage when moving toward the far position for shifting the slider, a latch for latching the slider in reset position, a feeler in the chute biased to inactive position when the slider is latched and to feeling position when it is unlatched, means for unlatching the slider when the carriage is manually unlocked, and carriage arresting means which limits the movement of the unlocked carriage away from its home position when the feeler in the chute engages an obstruction and prevents shift of the slider to the home position.

23. A depositing machine having a top plate provided with a deposit receiving hole, a deposit hanger extending upwardly through the rear part of the hole and having pins on which a deposit is adapted to hang pendent, top plate carried guides lateral of the hole, a door slidable in the guides and movable between hole opening and hole closing positions, a bar carried by the door at the front thereof and extending in a direction at right angles to the guides, the bar having an obliquely rearwardly extending cam at one end, and a reciprocable carriage having a member which bears on the front of the bar during a portion of its movement to hold the bar rearwardly and which cooperates with the cam to shift the door back and forth during another portion of the movement of the reciprocating carriage.

24. A depositing machine such as claimed in claim 23, wherein the bar is detachably carried by the door.

25. A depositing machine having means for supporting a deposit package in pendent position, a horizontally reciprocable carriage movable back and forth between a home and a far position and having cutting means to sever the package on the return stroke so that the lower portion of the deposit package may drop, a spring biased, pivoted carriage locking dog carried by the carriage, a spring biased hook engaging the carriage to normally prevent movement from the home position, a lock shaft having a cam which when turned actuates the carriage locking dog to shift the hook to release the carriage, carriage-actuated means effective during the initial movement thereof to further shift the hook and latch it against return movement, the lock shaft and hook having parts which then interengage to prevent return movement of the lock shaft until the carriage has returned to home position.

26. In combination, a fixed frame, a frame-carried oscillatory lock shaft having an unlocking cam and a reverse stop member, a reciprocatory carriage, a hook member pivoted to the frame and engageable with the carriage in the home position to prevent carriage movement, a second hook member pivoted to the frame, biased against the carriage and held in displaced position when the carriage is in the home position, a carriage release dog pivoted to the carriage engageable with the first hook member and operable by the unlocking cam to shift the first hook far enough to release the carriage, and means responsive to initial movement of the carriage to shift the first hook member behind the reverse stop and to release the second hook member for engagement with the first to hold it against movement from said shifted position, whereby return movement of the lock shaft is prevented when the carriage is out of the home position.

27. In combination, a fixed frame, a frame-carried oscillatory lock shaft having an unlocking cam and a reverse stop member, a reciprocatory carriage, a hook member pivoted to the frame and engageable with the carriage in the home position to prevent carriage movement, a second hook member pivoted to the frame biased against the carriage and held in displaced position when the carriage is in the home position, a spring biased carriage release dog pivoted to the carriage engageable with the first hook member and having a pawl engageable with the unlocking cam and forming a toggle to shift the first hook far enough to release the carriage, and means responsive to initial movement of the carriage to shift the first hook member behind the reverse stop and to release the second hook member for engagement with the first to hold it against movement from said shifted position, whereby return movement of the lock shaft is prevented when the carriage is out of the home position.

28. A depositing machine having a substantially vertical chute, a deposit package support from which a deposit may hang pendent in the chute, a manually operable reciprocating carriage, a manually releasable lock for locking the carriage in its home position, a carriage-carried cutter for severing the pendent package when the carriage is returning to the home position so that the package may fall through the chute, a reciprocable slider carried by the chute and spring biased to one position, latch means for holding the slider in the other position, carriage operated means for shifting the slider to latched position during the out stroke of the carriage, a chute-carried follower for the slider having one position when the slider is latched and a second position when it is in fully biased position, a feeler in the chute which in the presence of an object in the chute interferes with the shift of the slider to the fully biased position and holds the follower out of its second position, means operable by the manually operable lock for unlatching the slider concurrently with release of the carriage, and a carriage carried pawl engageable with the follower to arrest carriage movement when the package feeler interferes with the full movement of the chute-carried slider.

29. A depositing machine for use with a deposit package having two portions, the upper being adapted to become a receipt, the other when separated from the receipt portion, to be accepted as a deposit, said machine having a manually reciprocable carriage, a manually operable lock to lock the carriage in home position and release it for movement to a far position and return to home position, a stationary package support from which the complete package or a receipt portion only may be hung pendent, a chute into which the complete package extends, a normally closed door which prevents insertion of a package into the chute but allows the placing of a receipt portion only on the package support, carriage operated means to open the door as the carriage approaches the far position and to reclose it when the carriage is returning from the far position, carriage-carried means to sever the package on the return stroke thereof, and means carried by the carriage for stripping a receipt portion of the package support should such a receipt portion be in place when the carriage is shifted from the home position toward the far position.

30. In a depositing machine, means to support a deposit package hanging therefrom in pendent position, a reciprocating carriage having a horizontal platform movable past the hanging package, a platform-carried, vertical cutter supporting stud, a rotary cutter on the stud, a stationary shear plate past which the package extends and along which the cutter moves as the carriage moves back and forth, a platform-carried, printing arm supporting stud, a printing arm carried by the printing arm supporting stud and carrying a printing roller lateral of the cutter and at an elevation to print indicia on the package both above and below the line of severance, a spring biasing the printing roller against the package and shear plate, a platform carried, pivoted stripper finger above the cutter and spring biased against a stop, the finger being engageable with the package to yield and pass over the package when the carriage is moving in one direction and engageable with a package when moving in the other direction to strip the package off the package support.

31. A depositing machine for use with a deposit package having two portions, one adapted to become a receipt, the other when separated from the receipt portion, to be accepted as a deposit, said machine having a deposit receiver into which the deposit package may be inserted with the deposit portion end first, a normally closed door preventing insertion of a package but not interfering with the insertion of a receipt portion only, a shear plate and cooperable shear for severing the deposit package into the two portions, a reciprocable carriage having means to open and reclose the door at one end of its stroke and carrying printing devices for printing on the receipt portion, a pivoted finger reciprocable with the printing device and normally held in a path in which it engages the deposit package, the finger being freely yieldable to pass the package when the carriage is moving beyond the door closing position, and a stop preventing movement of the finger relative to the carriage should the finger engage a receipt portion when the carriage is moving toward door opening position and ejecting such receipt portion to prevent printing a false receipt thereon.

32. A depositing machine for use with a package having a surface to receive printing, said machine having a package support, a pressure receiver disposed in position to be opposite the printing surface when the deposit package is in position, a reciprocable carriage, a carriage carried printing roller spring biased toward the pressure receiver, a carriage carried cutter cooperative with the pressure receiver to sever the package through the printed area and form a receipt portion and a deposit portion, means preventing movement of the printing roller and cutter across the pressure receiver in one direction in the absence of a package to be printed and severed, and means to prevent moving the printing roller over a purported receipt portion when the printing roller is shifted in the opposite direction whereby printing at such purported receipt portion is prevented.

33. A depositing machine having a frame, a frame-carried reciprocating carriage, a carriage locking dog pivotally carried by the carriage and spring biased to a predetermined position, a pawl carried by the dog and spring biased to a predetermined position thereon, a frame-carried spring biased hook engageable with the carriage to retain it in an extreme home position, and in the path of the carriage locking dog to be actuated thereby, a manually operable lock shaft having a cam normally out of engagement with the pawl on the carriage-carried dog and engageable therewith to shift the carriage locking dog and effect movement of the hook to a carriage-releasing position, so that the carriage may be moved, carriage-carried means to further shift the hook before the dog is moved beyond the hook, and trigger means for locking the hook against return as the carriage moves away from the hook, and releasing the hook to relock the carriage on the return movement, the dog-carried pawl being yieldable in such return movement to pass by the lock cam so that the dog may then pass by the hook.

References Cited in the file of this patent

UNITED STATES PATENTS

| | | |
|---|---|---|
| 1,506,491 | Kline | Aug. 26, 1924 |
| 1,960,175 | Stevens | May 22, 1934 |
| 2,206,948 | Frankford | July 9, 1940 |
| 2,572,003 | Binns et al. | Oct. 23, 1951 |